(12) United States Patent
Limback et al.

(10) Patent No.: US 9,487,870 B2
(45) Date of Patent: Nov. 8, 2016

(54) APPARATUS, METHOD AND SYSTEM FOR RAPID SERVICE, REMOVAL AND REPLACEMENT OF AN ELECTROLYTIC CELL

(75) Inventors: Scott R. Limback, St. Paul, MN (US); Barry R. Taylor, Adrian, MI (US); Kevin A. Wuebben, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 203 days.

(21) Appl. No.: 13/546,256

(22) Filed: Jul. 11, 2012

(65) Prior Publication Data

US 2014/0013580 A1    Jan. 16, 2014

(51) Int. Cl.
| | | |
|---|---|---|
| C25B 1/00 | (2006.01) | |
| C25B 1/04 | (2006.01) | |
| C25B 9/00 | (2006.01) | |
| C25B 9/18 | (2006.01) | |
| C25B 13/00 | (2006.01) | |
| C25B 9/04 | (2006.01) | |
| C25B 9/08 | (2006.01) | |
| C25B 1/26 | (2006.01) | |

(52) U.S. Cl.
CPC . *C25B 9/04* (2013.01); *C25B 1/26* (2013.01); *C25B 9/08* (2013.01); *Y10T 29/49002* (2015.01)

(58) Field of Classification Search
CPC ............. C25B 1/04; C25B 9/00; C25B 9/18; C25B 13/00
USPC ............................................. 204/242, 275.1
See application file for complete search history.

(56) References Cited

U.S. PATENT DOCUMENTS

| | | |
|---|---|---|
| 1,284,618 A | 11/1918 | Dow |
| 3,869,376 A | 3/1975 | Tejeda |
| 4,130,468 A | 12/1978 | De Nora et al. |
| 4,469,571 A | 9/1984 | Fair et al. |
| 4,555,323 A | 11/1985 | Collier |

(Continued)

FOREIGN PATENT DOCUMENTS

| | | |
|---|---|---|
| GB | 2 352 728 A | 2/2001 |
| WO | WO 98/13304 A1 | 4/1998 |

OTHER PUBLICATIONS

ECOLAB USA Inc. et al., PCT/US2013/049873 filed Jul. 10, 2013, "Notification of Transmittal of the International Search Report and the Written Opinion of the International Searching Authority, or the Declaration" mailed Oct. 8, 2013.

(Continued)

*Primary Examiner* — Zulmariam Mendez
(74) *Attorney, Agent, or Firm* — McKee, Voorhees & Sease, PLC

(57) ABSTRACT

An improved electrolytic cell, its method and system configured for simple and rapid troubleshooting, removal and replacement of the cell or a component of the cell during service and maintenance procedures is disclosed. The electrolytic cell (12) is includes a host manifold (27) housing a degassing chamber (125) and various flow paths for routing liquid and gases into and out of a guest device (33) and the host manifold (27). The host manifold (27) is connected to input sources and output collections. The guest device (33) generally houses an anode chamber (104), a cathode chamber (112), and a brine chamber or reservoir (108) that serves as a source of anions and cations for the anode and cathode chambers. The guest device (33) is separable from the host manifold (27) to repair, maintain and/or replace the cell.

11 Claims, 11 Drawing Sheets

(56) References Cited

U.S. PATENT DOCUMENTS

| | | |
|---|---|---|
| 4,923,582 A | 5/1990 | Abrahamson et al. |
| 5,094,734 A | 3/1992 | Torrado |
| 5,445,722 A | 8/1995 | Yamaguti et al. |
| 5,628,888 A | 5/1997 | Bakhir et al. |
| 5,871,623 A | 2/1999 | Bakhir et al. |
| 5,932,171 A | 8/1999 | Malchesky |
| 5,985,110 A | 11/1999 | Bakhir et al. |
| 5,997,716 A | 12/1999 | Roberts et al. |
| 6,004,439 A | 12/1999 | Bakhir et al. |
| 6,592,727 B2 | 7/2003 | Yamamoto |
| 6,719,891 B2 | 4/2004 | Ruhr et al. |
| 6,923,893 B2 | 8/2005 | Sano |
| 7,238,272 B2 | 7/2007 | Sano |
| 7,276,255 B2 | 10/2007 | Selkon |
| 7,445,800 B2 | 11/2008 | Morris et al. |
| 2004/0124094 A1 | 7/2004 | Bo et al. |
| 2004/0168925 A1 | 9/2004 | Landau |
| 2005/0139808 A1 | 6/2005 | Alimi |
| 2006/0169575 A1 | 8/2006 | Sumita |
| 2007/0051640 A1 | 3/2007 | Bellamy |
| 2009/0008263 A1 | 1/2009 | Achiwa |
| 2010/0187129 A1 | 7/2010 | Sano |
| 2011/0011736 A1 | 1/2011 | Yost, III et al. |
| 2012/0058370 A1 | 3/2012 | Kell et al. |
| 2012/0118731 A1* | 5/2012 | Liang et al. ............... 204/275.1 |

OTHER PUBLICATIONS

ECOLAB USA Inc., PCT/US2013/049875 filed Jul. 10, 2013, "Notification of Transmittal of the International Search Report and the Written Opinion of the International Searching Authority, or the Declaration" mailed Oct. 8, 2013.

European Patent Office, "European Search Report" issued in connection to International Application No. EP 15150038.6-1360, 8 pages, mailed Jul. 6, 2015.

* cited by examiner

APPARATUS, METHOD AND SYSTEM FOR RAPID SERVICE, REMOVAL AND REPLACEMENT OF AN ELECTROLYTIC CELL

FIELD OF THE INVENTION

The invention relates to an apparatus, method and system for rapid service, removal and replacement of an electrolytic cell. In particular, the invention relates to an electrolytic cell configured for simple and rapid troubleshooting, removal and replacement of the cell or a component of the cell during service and maintenance procedures.

BACKGROUND OF THE INVENTION

The production of acidic electrolyzed water and alkaline electrolyzed water by the electrolysis of water in which chlorine electrolyte has been added is well-known. Commercially available three-chamber electrolytic cells are one exemplary means for electrolyzing sodium chloride solutions. In a conventional mode of operation, these cells have two output solutions that are simultaneously provided, namely an acidic solution containing hypochlorous acid and hydrochloric acid in a relatively dilute form (anolyte), and an alkaline solution containing sodium hydroxide (catholyte). The hypochlorous acid in the acidic solution is a form of free chlorine and a very effective germicide. However, in the acidic solution, hypochlorous acid is relatively unstable; it is in equilibrium with the molecular chlorine in the solution, which over time will come out of the solution. Some of the chlorine in the solution escapes into the vapor head space above a contained body of the solution. There is also a chlorine odor associated with the solution, as well as the possibility of chlorine concentrations developing in the vapor space above the body of chlorine solution that exceed allowable NIOSH limits. As the need arises to generate a solution with greater germicidal efficacy (e.g., to create a solution that can be registered with the EPA as a sanitizer or disinfectant), the concentrations of chlorine in the vapor space above the solution become more problematic.

In addition, the chlorine in hypochlorous acid is a very aggressive oxidizing agent. Surfactants that might be added to the solution to enhance wetting properties are readily attacked by the chlorine in the hypochlorous acid. The same is true for surface materials with which the solution might come into contact during its application. Both of these problems become more significant as the strength of the solution is increased to enhance efficacy. All of these problems are mitigated by adding a base, such as a sodium hydroxide, to the acidic solution to raise its pH and to create an alkaline solution in which the chlorine in the hypochlorous acid has been converted to its ionic form, the hypochlorite ion.

In traditional cells, sodium hydroxide is produced during the operation of the cell. Therefore, a use in this art has been identified which includes using the alkaline solution in a self-contained process to neutralize the acidic solution produced by the cell and generate an alkaline sodium hypochlorite solution. Over time the various components within the cell fail due to wear and tear, degradation effects, and other causes. Subsequent troubleshooting, service, removal and replacement of the cell and its components are thus required.

Accordingly, it is an objective of the claimed invention to develop an improved apparatus, method and system for rapid service, removal and replacement of an electrolytic cell or a component of the cell.

Traditionally, servicing, replacing and maintaining an electrolytic cell almost always requires several or all of the various connections, liquid, electrical or otherwise, to be taken apart and/or disassembled. The complexity of these various connections poses a risk of improper reassembly or significant downtime.

Accordingly, a further object of the claimed invention is to provide a quick and rapid apparatus, system and method for servicing, replacing and maintaining an electrolytic cell that removes the risk of improperly disassembling or assembling the cell and incurring significant downtime in the process.

These and other objects of the invention will be readily ascertained by one skilled in the art based on the description of the invention.

BRIEF SUMMARY OF THE INVENTION

In one embodiment, the invention is an electrolytic cell configured for simple and rapid cell troubleshooting, removal and replacement during service and maintenance procedures. The cell includes a distribution manifold having a host interface and a flow path originating at an inlet and terminating at an outlet at the host interface. A cathode section has a flow path adapted for carrying cations and a guest interface with an exchange connection configured for removably seating at the host interface. Similarly, an anode section has a flow path adapted for carrying anions and a guest interface with an exchange connection configured for removably seating at the host interface. Electrodes are associated with the respective anode and cathode sections. In a preferred form, the cell includes an electrolyte section having a flow path adapted for carrying an electrolyte and a guest interface with an exchange connection configured for removably seating at the host interface. In one design, the flow path in the distribution manifold is a degassing chamber having an inlet removably connected to the cathode flow path and the outlet removably connected to the anode flow path.

In another embodiment, the invention is a simple and rapid troubleshooting, removal and replacement method for servicing and maintaining an electrolytic cell. A distribution manifold having a host interface and a flow path originating at an inlet and terminating at an outlet at the host interface is provided. A guest interface of a cathode section is removably connected at the host interface. The cathode section has an exchange connection and a flow path for carrying cations. A guest interface of an anode section is removably connected at the host interface. The anode section has an exchange connection and a flow path for carrying anions. Liquid is communicated to the cathode and anode flow paths through the flow path in the distribution manifold. In a preferred form of the invention, the method also includes removably connecting a guest interface of an electrolyte section at the host interface. The electrolyte section has an exchange connection and a flow path for carrying an electrolyte. One of the flow paths in the distribution manifold are configured as a degassing chamber. The inlet of the chamber is removably connected to the cathode flow path and the outlet is removably connected to the anode flow path.

In another embodiment, the invention is a system for simple and rapid troubleshooting, removal and replacement of an electrolytic cell during service and maintenance procedures. The system includes a distribution manifold having a host interface and a flow path originating at an inlet and terminating at an outlet at the host interface. The system also includes a guest device that has a guest interface with an exchange connection configured for removably seating at the host interface of the distribution manifold. The guest device also includes an electrolytic cell having a cathode section with a flow path adapted for carrying cations and an anode section having a flow path adapted for carrying anions. The electrolytic cell is in fluid communication with the exchange connection at the guest interface. In a preferred form, the guest device is serviced and replaced without having to disassemble connections to the distribution manifold.

While multiple embodiments are disclosed, still the other embodiments of the present invention will become apparent to those skilled in the art from the following detailed description, which shows and describes illustrative embodiments of the invention. Accordingly, the drawings and detailed description are to be treated as illustrative in nature and not restrictive.

DETAILED DESCRIPTION OF THE PREFERRED EMBODIMENT

Figure 1:
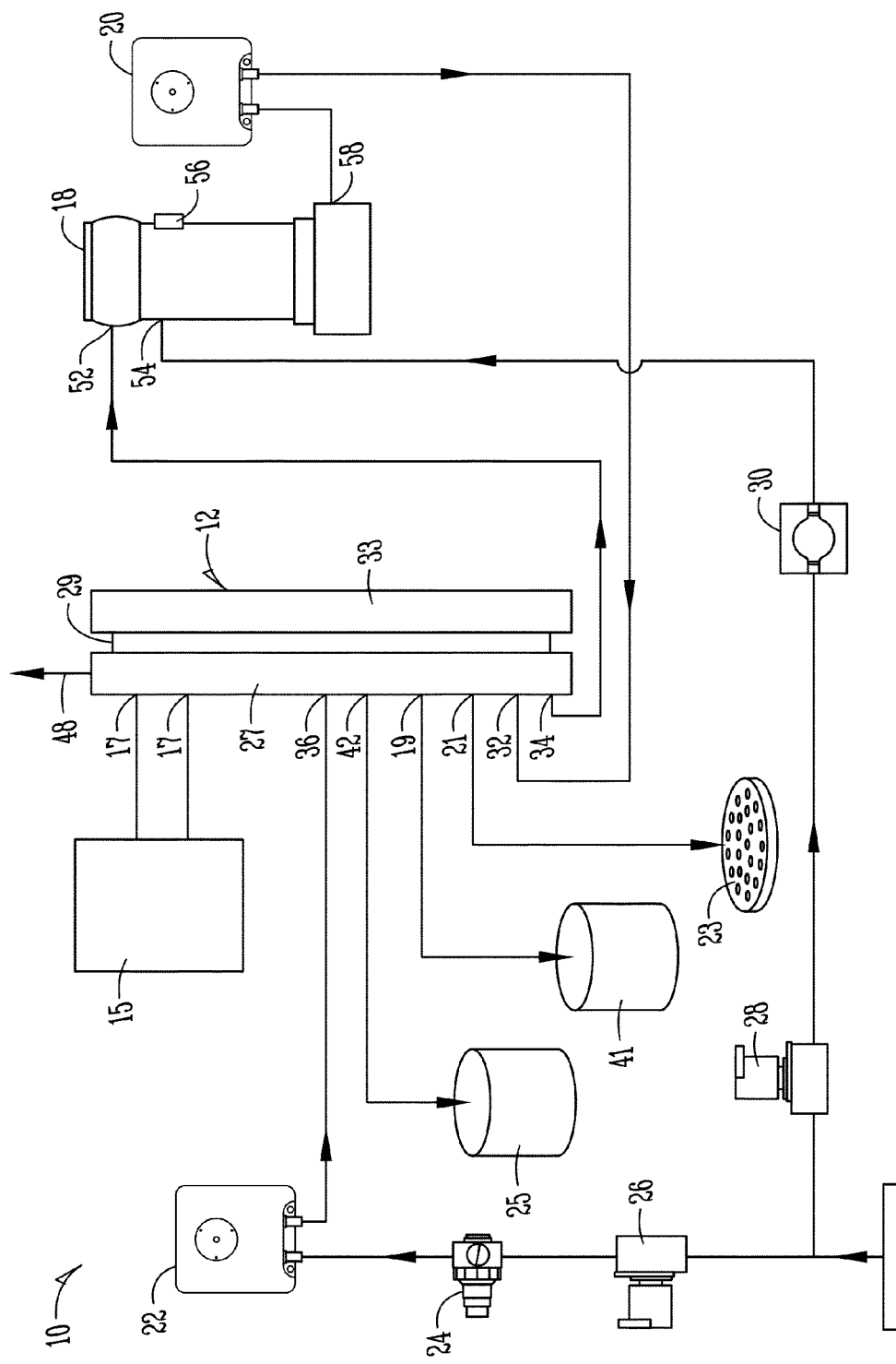
FIG. 1 is an exemplary illustration of a system using an electrolytic cell of the present invention configured for simple and rapid troubleshooting, removal and replacement of the cell or a component of the cell during service and maintenance procedures.

The present invention relates to an improved electrolytic cell, its method, and a system disclosing the same. Various embodiments of the present invention will be described in detail with reference to the drawings, wherein like reference numerals represent like parts throughout the several views. Reference to various embodiments does not limit the scope of the invention. Figures represented herein are not limitations of the various embodiments according to the inventions and are presented for exemplary illustration of the invention only.

FIG. 1 illustrates an exemplary system 10 of the present invention for accomplishing in situ generation of electrolysis solutions using an electrolytic cell, such as an electrolytic cell 12 with two or more chambers. The system 10 illustrated in FIG. 1 is one exemplary embodiment of a system configured to increase the chlorine capture efficiency and concentration in an output solution provided by the cell 12. In the exemplary system 10 illustrated in FIG. 1 a guest device 33 is shown that includes several components for facilitating operation of the cell 12. The guest device 33 generally includes in some form or configuration an electrolysis chamber with a positively charged electrode (anode), a brine or electrolyte chamber, and an electrolysis chamber with a negative charge electrode (cathode)(See FIG. 2C). Further description of the components of an electrolytic cell designed to perform the process of electrophoresis and suitable for use according to the invention is set forth in U.S. patent application Ser. No. 12/743,785 (Ecolab USA Inc.), which is herein incorporated by reference in its entirety.

FIG. 1 also illustrates an exemplary system of the invention for accomplishing simple and rapid troubleshooting, removal and replacement of the electrolytic cell or a component of the cell during service and maintenance procedures. The cell 12 generally includes a host manifold 27 connected to various other components of the illustrated system. The host manifold 27 supports operation of the guest device 33 generally including one or more operational components of the cell 12. In a configuration of the system, one of the inputs 36 to the cell 12 is water from a water source 37. Water is communicated through a line which is selectively opened and closed by a valve 26. A pressure regulator 24 may be incorporated into the line to regulate the pressure of the water from the source pressure as is appropriate for use in the system 10. A pump 22, such as a peristaltic pump, may also be included in the line to pump water from the water source 37 into the host manifold 27. The water source 27 is preferably hard-plumbed to the input 36 of the host manifold 27. For example, a technician or installer, when installing the system 10 plumbs the water line to the input 36 of the host manifold 27. The pump 22 connected to the water line allows the volume of water communicated through the input 36 to be controlled, such as at a preferred volumetric rate of flow. The water passes into the host manifold 27 through the input 36 and routing of the water to the guest device is controlled by the host manifold 27. For example, water is routed from the host manifold 27 through the interface 29 to a cathode chamber 112 (see FIG. 2C) in the guest device 33 for producing an alkaline solution containing sodium hydroxide (catholyte). Catholyte exits the cathode chamber 112 through a cathode chamber outlet and is routed back into the host manifold 27. The catholyte is then communicated through the degassing chamber 125 (See FIG. 2B) preferably housed in the host manifold 27. New water is then pumped into the cathode chamber 112 through the host manifold 27 from pump 22. As is discussed below, catholyte enters the degassing chamber 125 through a degassing chamber inlet. The degassing chamber 125 is a component of the system that generally does not require replacement, repairs or service and is housed in the host manifold 27 according to one design of the present invention. The degassing chamber 125 separates hydrogen gas from the catholyte liquid solution received from the cathode chamber 112 of the electrolytic cell 12. The hydrogen gas exits the degassing chamber 125 through a vent 48 in the host manifold 27 which allows the hydrogen gas to be released into the atmosphere at atmospheric pressure. In one design as discussed below, gas (e.g., hydrogen gas) bubbles are separated from the catholyte at the point where the catholyte liquid enters the degassing chamber 125 with the gas being vented out vent 48 and the degassed fluid falling by gravity to an accumulation chamber at the bottom of the degassing chamber 125. The host manifold 27 also may include one or more outputs 19 and 21 to carry overflow or excess, for example, from the degassing chamber 125 to a drain 23 or into a container 41 (e.g., a day tank) for storing the catholyte solution. Ports, channel ways, ducts or other flow carrying means route these flows from the degassing chamber 125 through the host manifold 27 to the outputs 19 and 42. The degassing chamber 125 may also include an outlet connected in fluid communication with an external or internal pump (e.g., a peristaltic pump not shown). The pump could be configured to pump the catholyte solution from the degassing chamber 125 into the anode chamber 104 (See FIG. 2C) of the electrolytic cell 12 within the guest device 33. In this instance where the pump (not shown) is external, the pump fed catholyte is routed into and out of the host manifold 27 through respective inputs and outputs in the host manifold 27. Similarly, an internal pump (not shown) could have inputs and outputs routed through the host manifold into communication with the degassing and anode chambers respectively. Use of a pump permits the feed rate of catholyte solution into the anode chamber to be controlled, (e.g., at a rate slightly less than the rate at which catholyte is discharged from the cathode chamber) to avoid pumping air into the anode chamber. The catholyte is routed from the degassing chamber in the host manifold 27 into the anode chamber 104, creating an alkaline solution in which the chlorine and the hypochlorous acid has been converted to its ionic form, the hypochloric ion, thereby generating alkaline sodium hypochlorite solution. The output solution is communicated from the anode chamber via an anode chamber outlet. Preferably, an output 42 at the host manifold 27 is hard plumbed into communication with a container (e.g., day tank). The output 42 is routed through the host manifold 27 into communication with the outlet of the anode chamber. To facilitate the electrolytic process, electrolyte such as a brine solution is formulated in tank 18. The electrolyte is pumped from the tank 18 through outlet 58 using pump 20. The electrolyte is communicated through a line into a brine chamber 108 (See FIG. 2C) in the electrolytic cell 12 via an input 32 into the host manifold 27. The input 32 of the host manifold 27 is preferably hard-plumbed into communication with tank 18. The electrolyte passes through the brine chamber 108, and in one embodiment between the cathode chamber 112 and the anode chamber 104 and exits the electrolytic cell 12 by being routed through the host manifold to output 34. The electrolyte then returns back to the tank 18 by traveling through the line and through tank inlet 52. The tank 18 is fed water from a water source. A valve 28 may be connected inline for selectively opening and closing the line to permit flow of water into the tank 18 through inlet 54. A flow control device 30 may be included in-line to control the rate of which water is introduced into the tank 18. One or more sensors, such as a level sensor 56, may be used in connection with tank 18 to monitor the volume of electrolyte within the tank.

As discussed above, incorporating a pump (not shown) into the line connecting the outlet of the cathode chamber 112 (See FIG. 2C) and the inlet of the anode chamber 104 allows the rate at which catholyte from the cathode chamber 112 is introduced into the anode chamber 104 to be controlled. It is beneficial to provide a system 10 of the present invention that recirculates all of the catholyte (i.e., "100% recycle") produced by the cathode chamber 112 through the anode chamber 104 of the electrolytic cell 12.

According to one configuration of the present invention, wires for carrying electrical power and/or for communicating operating commands may be wired to and routed through the host manifold 27 and connected to the guest device 33 through the interface 29. For example, wires 17 originating at an electrical supply 15 may be hardwired to the host manifold 27 and routed through the host manifold 27 to connection points at the interface 29 for removable connection to one or more electrically operated components in the guest device 33 (e.g., anode electrode, cathode electrode).

Figure 3:
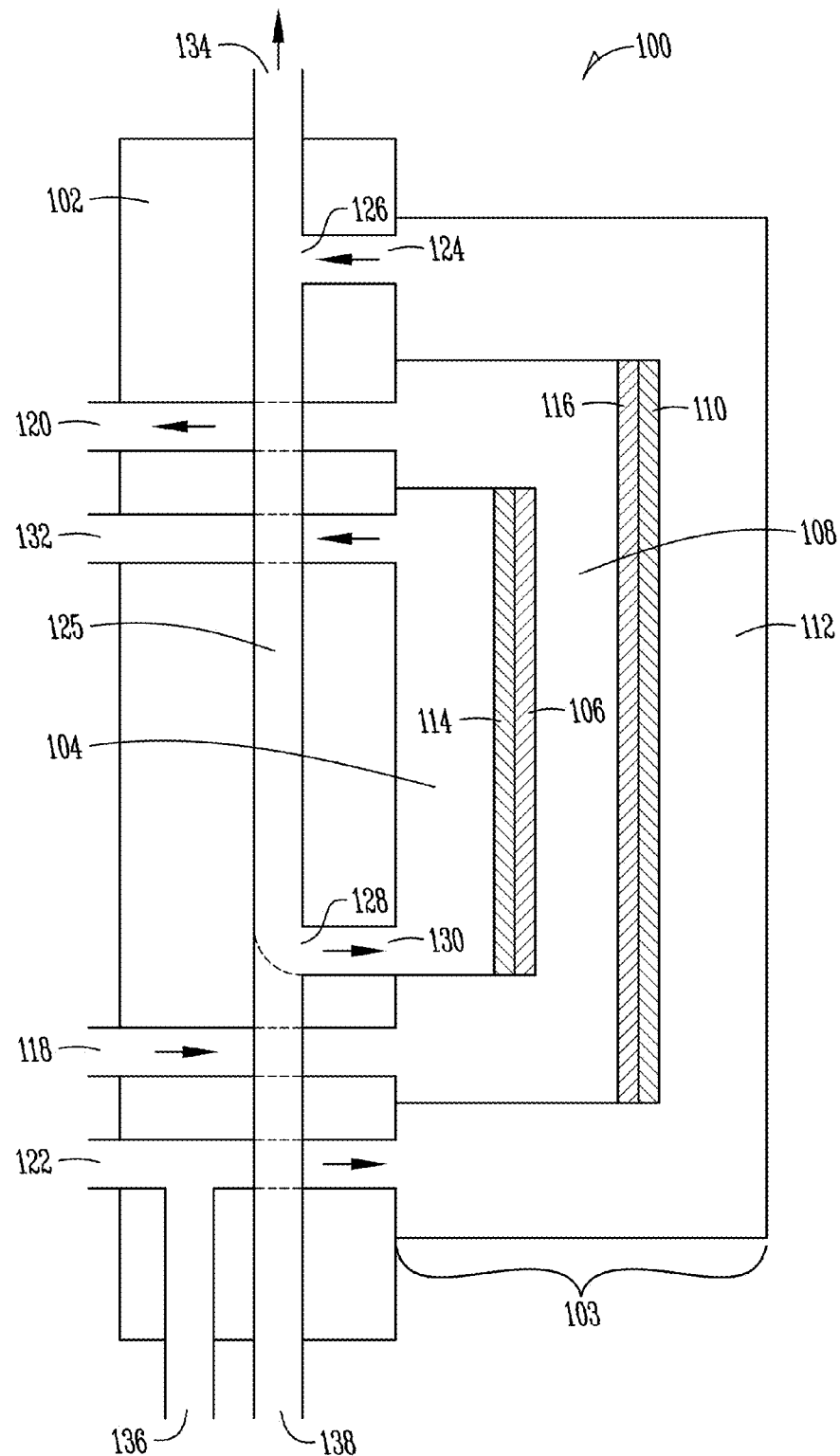
FIG. 3 is an exemplary schematic illustrating one embodiment of an electrolytic cell of the present invention.

As discussed above, the exemplary system 10 of the present invention may be configured (as best shown in FIG. 3) so that the outlet 128 of the degassing chamber 125 is connected in fluid communication with the inlet 130 of the anode chamber 104 of the electrolytic cell 100. In lieu of a pump to communicate catholyte from the degassing chamber 125 into the inlet 130 of the anode chamber 104 the system 100 may be configured to use gravity to feed the catholyte solution from the degassing chamber 125 into the inlet 130 of the anode chamber 104 of the electrolytic cell 100 as discussed above. Gravity feed of the catholyte from the degassing chamber 125 into the anode chamber 104 of the electrolytic cell 100 is accomplished by positioning the inlet 126 to the degassing chamber 125 at a position at least level with or above the outlet 132 of the anode chamber 104. The flow of output solution from the anode chamber 104 is controlled by a non-equilibrium scenario in the head pressure established between the volume of catholyte in the degassing chamber 125 and the output solution in the anode chamber 104 of the electrolytic cell 100. As catholyte enters the degassing chamber 125 via the inlet 126, a reservoir of catholyte solution collects within the degassing chamber 125. As the level of the reservoir reaches the level of the outlet 132 of the anode chamber, the head pressure on the reservoir of liquid catholyte solution within the degassing chamber 125 forces the output solution in the anode chamber 104 out the outlet 132. Thus, as the rate of flow of catholyte into the degassing chamber 125 increases, the rate at which catholyte solution flows into the anode chamber 104 also increases. In this configuration, all the catholyte solution produced by the cathode chamber 112 is recycled through the anode chamber 104 of the electrolytic cell 100. The recycling process is achieved by gravity feeding the catholyte solution from the degassing chamber 125 through the anode chamber 104. This configuration also prevents air from being introduced into the anode chamber 104 of the electrolytic cell 100, since liquid head pressure is used to move the catholyte solution from the degassing chamber 125 through the anode chamber 104. While the catholyte solution is in the degassing chamber 125 hydrogen gas is released from the solution and exits through a vent 134 into the atmosphere at atmospheric pressure. The present invention also contemplates that a degassing membrane with an accompanying vacuum pump may be used in place of the degassing tower for degassing the catholyte liquid solution at a pressure above atmospheric pressure. In this design, the acquired hydrogen gas could be directed/diverted to another location, release or collection point. The cell 11 could also be designed to include a degassing membrane that operates at atmospheric pressure and does not require a pump by using atmospheric pressure exerted on the degassing membrane.

Figure 2A:
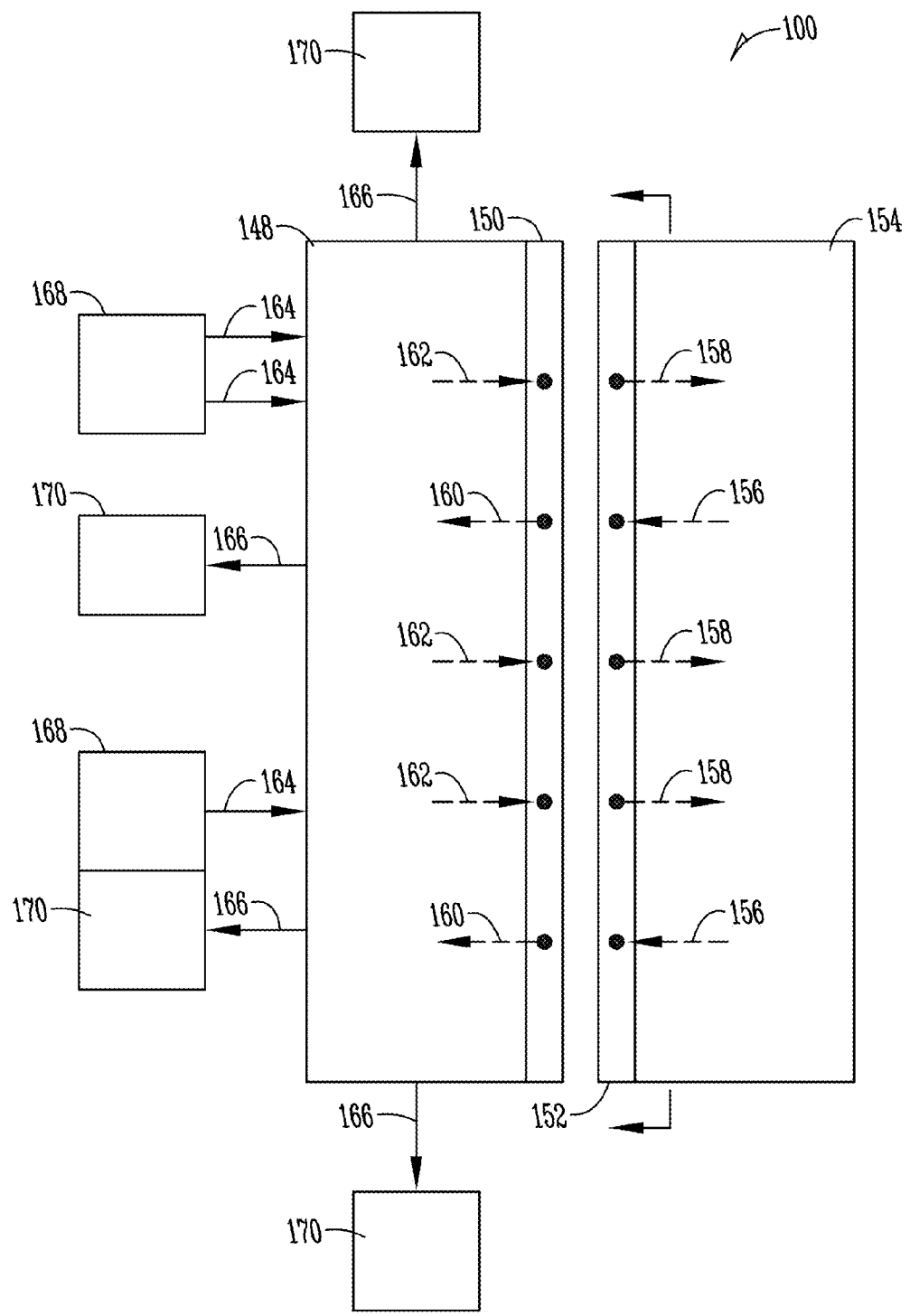
FIG. 2A is another exemplary illustration of the electrolytic cell shown in FIG. 1.

FIG. 2A illustrates an exemplary embodiment of an electrolytic cell 100 configured to achieve the objectives of the present invention. According to one aspect of the present invention, the host manifold 148 is configured to house components and/or features of the electrolytic cell 100 that generally do not require service, maintenance, and/or replacement over the operational life of the cell 100. Additionally, the guest device 154 is configured to house components and/or features of the electrolytic cell 100 that my require service, maintenance, or replacement during the operational life of the cell 100. In general, several inputs and outputs are connected to the host manifold 148. These connections generally are not temporary, but configured to be long term, such as hardwiring to the host manifold 148 and/or hard plumbed connections to the host manifold 148. A technician or installer generally, during installation of the electrolytic cell 100 at a use location, hardwires and or hard plumbs many of the input and outputs to the host manifold 148. For example, one or more operation support sources 168 may be hardwired or hard plumbed into connection with the host manifold 148 at host manifold inputs 164. Conversely, the host manifold 148 may be connected or plumbed into connection with one or more operation output collections 170 via host manifold outputs 166. The present invention also contemplates that connections made to host manifold 148 from operation support sources 168 and/or operation output collections 170 may be made via soft connections (e.g., quick couplers, compression fittings, slip joints, or other connections that allow operation support sources 168 and operation output collections 170 to be removably connected to the host manifold). According to one aspect of the invention, operation support sources 168 may include liquid sources such as a water source or a brine source. Operation support sources 168 may also include a power source for providing electrical power or a controller for providing control operation or commands for operating various functions or features of the electrolytic cell 100. The operations output collections 170 may include, for example, a container or day tank for collecting output solutions from the cell 100. The operation output collections 170 may also be a container such as a gas chamber for collecting gasses output by the cell. Operation output collections 170 could also be a drain whereby unused or unwanted solution or liquid dispensed from the cell is dispensed to. The host manifold 148 is preferable configured to route output and inputs to the cell 100 from the operation support sources 168 and/or operation output collections 170 to a feature (e.g., a degassing chamber) within the manifold 148 and/or to post interface inlets and outlets 160 and 162 in the host interface 150 of the host manifold 148. Operation support sources 168 and/or operation output collections 170 provided by and/or received from the guest device 154 are communicated to and from the host manifold 148 through the host interface 150 and guest interface 152. As shown in FIG. 2A, the host interface 150 includes host interface inlets and host interface outlets 162. Upon removable attachment of the guest interface 152 to the host interface 150, guest interface inlets 158 and guest interface outlets 156 are connected into communication with respective host interface outlets 162 and host interface inlets 160. In other words, when the guest device 154 and the host manifold 148 are connected together at host interface 150 and guest interface 152, the operation support sources 168 and operation output collections 170 are brought into connection, where routed to be, with features and components housed in the guest device 154.

Figure 2B:
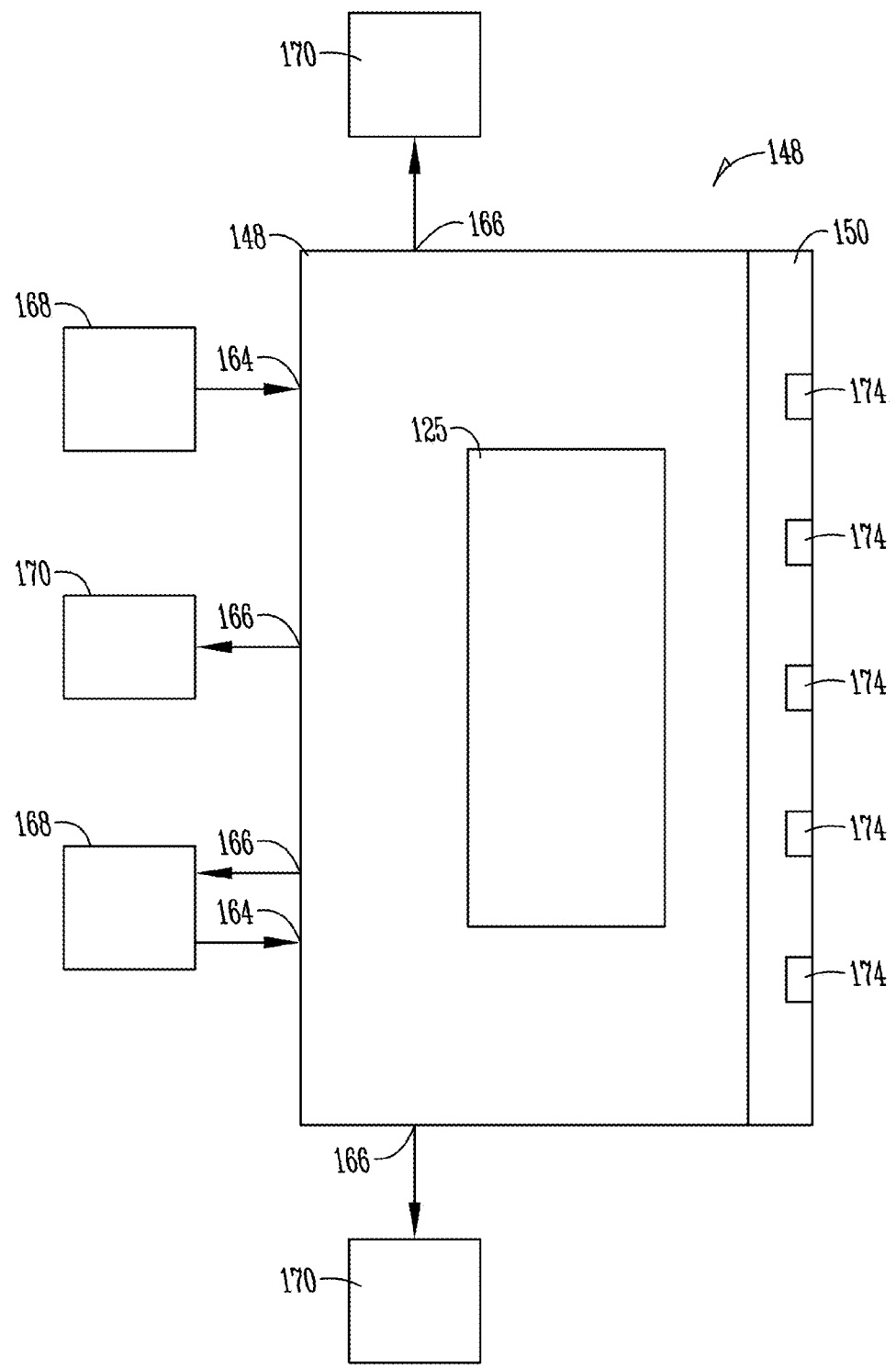
FIG. 2B is another exemplary illustration of the host manifold shown in FIG. 2A.
Figure 2C:
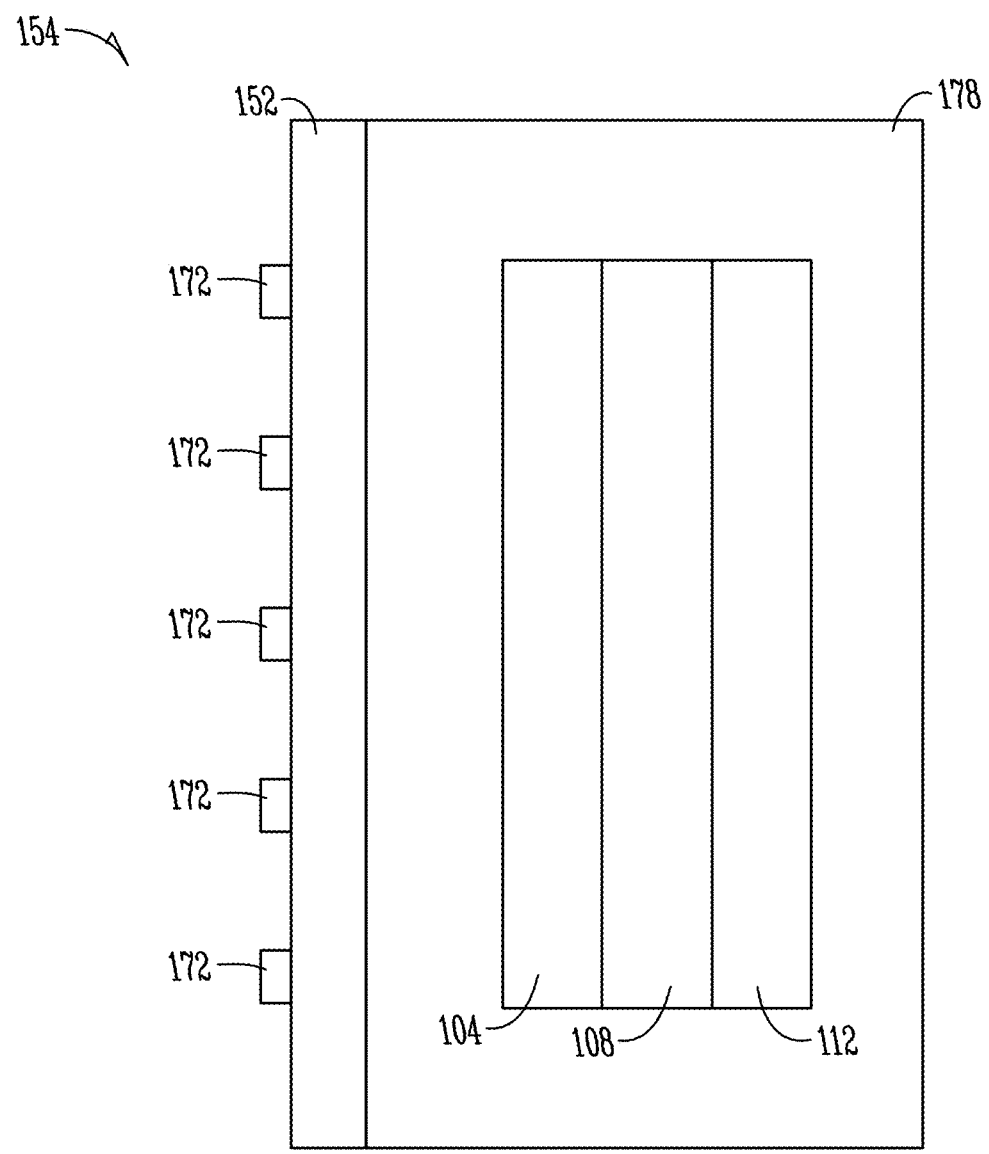
FIG. 2C is another exemplary illustration of the guest device shown in FIG. 2A.

FIGS. 2B and 2C illustrate respective host manifold 148 and guest device 154 sections of the electrolytic cell 100 shown in 2A. In one configuration, as illustrated in FIG. 3, the host manifold 148 includes a degassing chamber 125 as discussed above. The host manifold many include one or more ducts, channels, or flow paths for connecting the degassing chamber 125 into communication with one or more operation support sources 168 or operation output collections 170. For example, as discussed above, the degassing chamber 125 may be connected into communication with an operations output collection 170, such as a container or a tank for collecting gas output from the chamber 125. The degassing chamber 125 may also be configured to exhaust gas from the chamber 125 to the ambient environment through the host manifold 148. Other collections 170 may be used to collect liquid drain from the chamber before service and/or repair is given to the guest device 154 shown in FIG. 2C. The degassing chamber 125, operation support sources 168, and operation output collections 170 may be connected to features or components housed in the guest device 178 by being routed to guest device connections 174 housed in the host interface 150 of the host manifold 148. The guest device connections 174, preferably upon mating the host interface 150 and guest interface 152 together, are connected to allow communication between the degassing chamber 125, operation support sources 168, and operation output collections 170 in the components housed within the guest device 178. For example, the host manifold connections 172 in the guest interface 152 mate with a seal to respective guest device connections 174 in the host interface 150 upon mating of the host manifold 148 and guest device 178 together. Air, liquid, electricity, control commands, etc. may be communicated back and forth between the host manifold 148 and the guest device 178 through the guest device connections 174 and host manifold connections 172. For example, as shown in FIG. 3, one operation support source 168 may include a brine tank (such as the brine tank 18 shown in FIG. 1) for communicating an electrolyte through the host manifold 148 to a brine chamber 148 housed in the guest device 178. The electrolyte may be communicated back through the guest device 178 to the host manifold 148 and back to operation support source 168 for reformulation of the brine. Similarly, an operation support source 168 may be connected in fluid communication with the host manifold 148 for providing liquid (e.g., water) to a cathode chamber 112 housed in the guest device 178. The water is passed through the host manifold 148 into the guest device 178 through guest device connections 174 through a respective guest device connection 174 and host manifold connection 172. The catholyte produced in the cathode chamber 112 is routed through the guest device to a host manifold connection 172 and passes into the host manifold 148 through a guest device connection 174 in the host interface 150. The catholyte is routed to the degassing chamber 125, degassed, as discussed above, and routed back to the guest device 178 into the anode chamber 104 by passing through a guest device connection connected to a host manifold connection 172 in the guest interface 152. Thus, according to one aspect of the invention, the catholyte is recycled through the anode chamber 104 after passing through the degassing chamber 125. In one aspect of the invention, liquid head pressure of the catholyte in the degassing chamber 125 is used to pass the liquid from the degassing chamber 125 through the guest device connection 174 connected to the host manifold connection 172 and advance the liquid through the anode chamber 104. After passing through the anode chamber 104, the liquid is routed through the guest device 178 to a host manifold connection 172 connected into communication with a guest device connection 174 in the host interface 150. The solution is then routed to an operation output collection 170 (e.g., day tank) to collect the solution produced by the cell 100.

EXAMPLE

Embodiments of the present invention are further defined in the following non-limiting example. It should be understood that this example, while indicating a certain embodiment of the invention, is given by way of illustration only. From the above discussion and this example, one skilled in the art can ascertain the essential characteristics of the invention, and without departing from the spirit and scope thereof, can make various changes and modifications of the embodiments in the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

FIG. 3 is a schematic illustration of an electrolytic cell 100 configured with the combined features shown in FIGS. 2A-C generally. The cell illustrated in FIG. 3 is but one exemplary illustration of an electrolytic cell 100 that includes non-service requiring features or components in the host manifold and features requiring service, repair or replacement during the operational life of the cell 11 are generally housed in the guest device 103. The electrolytic cell 100 may be disassembled (i.e., taken apart) into its component parts for troubleshooting, repairing or replacing worn or damaged components, or for cleaning. The design of the electrolytic cell 100, as discussed above, permits plumbing (including electrical) lines in connection to the inlets and outlets of the cell on a single side through a single host manifold 102 that is a component part of the electrolytic cell 100. The electrolytic cell 100 also generally includes an anode chamber 104, a brine chamber 108 and a cathode chamber 112 housed in the guest device 103. These chambers may be fabricated from polypropylene; however, other materials such as polyvinyl chloride (PVC) or polyethylene are contemplated materials of the present invention. According to one configuration of the electrolytic cell 100, the cathode and brine chambers 112, 108 are generally U-shaped to provide surface area in contact with the host manifold 102 for routing connections between the host manifold 102 and the guest device 103. The cathode chamber 112 includes an inlet 122 and an outlet 124. The inlet to the cathode chamber 112 is routed through the host manifold 102 and is located on an external face of manifold 102 for connecting to a liquid source (e.g., water source shown in FIG. 1). The inlet 122 includes a flow path routed through the manifold 102 into communication with the cathode chamber 112. Similarly, the outlet 124 from the cathode chamber 112 is in communication with a flow path routed through the guest device 103 and host manifold 102 that is in fluid communication with an inlet 126 to the degassing chamber 125. The flow path connecting the outlet 124 with the inlet 126 is separable upon detachment of the guest device 103 from the host manifold 102. The inlet 126 of the degassing chamber 125 is positioned or elevated above the location of the outlet 128 to the degassing chamber 125. The outlet 128 is routed by a flow path through the host manifold 102 and guest device 103 into fluid communication with the inlet 130 to the anode chamber 104. The flow path connecting the outlet 128 and inlet 130 is separable upon detachment of the guest device 103 from the host manifold 102. The degassing chamber 125 may also include a flow path routed through the host manifold to a drain outlet 138 plumbed, for example, into fluid communication with a drain (e.g., drain 23 as shown in FIG. 1). The plumbed line may include a flow control device (e.g., a valve) to selectively allow and disallow liquid flow to the drain outlet 138 from the anode chamber 104 and the degassing chamber 125. A flow path may also be routed through the host manifold 102 from the degassing chamber 125 to a vent outlet 134 in the manifold 102 for venting gas from the degassing chamber 125 into the ambient environment. A flow path is routed from the outlet 132 of the anode chamber 104 through the guest device 103 and host manifold 102. The flow path is plumbed into communication with collection means (e.g., day tank or container 25 shown in FIG. 1) for collecting the output solution from the cell 100. The flow path connecting the outlet 132 with the anode chamber 102 is separable upon detachment of the guest device 103 from the host manifold 102. A flow path may also be routed through the host manifold 102 and guest device 103 to connect an inlet 118 and outlet 120 in the manifold 102 with the brine chamber 108 in the guest device 103. The flow path connecting the inlet 118 and outlet 120 in the host manifold 102 with the brine chamber 108 in the guest device 103 is separable upon detachment of the guest device 103 from the host manifold 102. A line may also be plumbed into connection with the host manifold (e.g., drain outlet 21 shown in FIG. 1) at the drain outlet 136 whereby liquid in the cathode chamber 112 may be selectively drained using a flow control device (e.g., a valve) not shown. A flow path may be routed through the host manifold 102 and guest device 103 into connection with the inlet 122 of the cathode chamber 112; the flow path between these points is separable upon detachment of the guest device 103 from the host manifold 102. As further illustrated in FIG. 3 and discussed above, the inlet 126 to the degassing chamber 125 is positioned or elevated above the level of outlet 128 in fluid communication with anode chamber 104 via inlet 130. The flow path connecting the outlet 128 of the degassing chamber 125 with the anode chamber 104 is routed through the host manifold 102 and guest device 103; the flow path between these points is also separable upon detachment of the guest device 103 from the host manifold 102.

In operation, the electrolytic cell 100 provides a water-electrolyzing device outputting alkaline sodium hypochlorite solution. In operation, water is routed through the host manifold 102 and guest device 103 into the cathode chamber 112 housed in the guest device 103. Simultaneously and continuously during operation of the cell, an electrolyte, such as a brine solution, is routed through the host manifold 102 and guest device 103 into the brine chamber 108 via inlet 118. Wiring for carrying electrical current (e.g., from a source 15 such as shown in FIG. 1) may be routed through the host manifold 102 and guest device 103 into connection with one or more electrodes. The cell 100 may configured so that the wiring connection between the host manifold 102 and guest device 103 is separable to allow the separation of the guest device 103 from the host device 102. Alkaline water (catholyte) is generated in the cathode chamber 112 by loading electric current so as to electrolyze the water in the presence of electrolyte supplied by means of electrophoresis from the intermediate chamber 108. The catholyte, which may consist of sodium hydroxide or potassium hydroxide and hydrogen gas generated in the cathode chamber 112, passes through the guest device 103 into the degassing chamber 125 in the host manifold 102 via inlet 126. During this process, the electrolyte solution in the brine chamber 108 is circulated through the flow path in the host manifold 102 and guest device 103 in communication with the inlet 118 and outlet 120 of the brine chamber 108 to maintain the correct concentration of electrolytes in the brine chamber 108. The catholyte (e.g., sodium hydroxide) resides in the degassing chamber 125, thereby releasing hydrogen gas which travels through the host manifold 102 and out the vent outlet 134. The alkaline solution (catholyte) flows through the outlet 128 of the degassing chamber 125 in the host manifold 102 into the anode chamber 104 in the guest device 103 via inlet 130. The catholyte is electrolyzed in the presence of electrolytes supplied by means of electrophoresis from the brine chamber 108, and thereby generates an alkaline sodium hypochlorite solution. This is accomplished by converting the chlorine in the hypochlorous acid to its ionic form, the hypochlorite ion. The head pressure created by gravity acting on the reservoir of catholyte liquid in the degassing chamber 125 forces this solution from the anode chamber 104 through the guest device 103 into the host manifold 102; the solution is dispensed from the host manifold 102 as an output solution of the electrolytic cell 100, which may be collected in a contain or day tank (e.g., container 24 or 41 shown in FIG. 1). One or more of the flow paths within the electrolytic cell 100 may be configured with a flow control device (e.g., a valve) to permit one or more of the flow paths to be selectively opened or closed to drain catholyte or the output solution from the guest device 103 and host manifold 102. For example, catholyte may be drained from the degassing chamber 125 through the host manifold via the drain outlet 138 by opening the flow path using a flow control device (not shown) in the host manifold 102. Similarly, the solution within the anode chamber 104 may be drained through the guest device 103, host manifold 102, and out drain outlet 138. The host manifold 102 may include one or more flow control devices, either electrically or manually operated, for controlling the flow from flow pathways and chambers in the host manifold 102 and/or guest device 103 through drain outlet 138 and/or drain outlet 136. In the event the catholyte in the cathode chamber 112 is drained from the cell 100, the liquid passes through the flow path in the guest device 103 connected in communication with the drain outlet 136 in host manifold 102. Alternatively, the flow control device may be configured in the plumbing connected to the host manifold 102 whereby one of more of the flow paths into or out of the host manifold 102 are selectively closed or opened to inhibit or permit liquid flow into or out of the host manifold 102.

Figure 4:
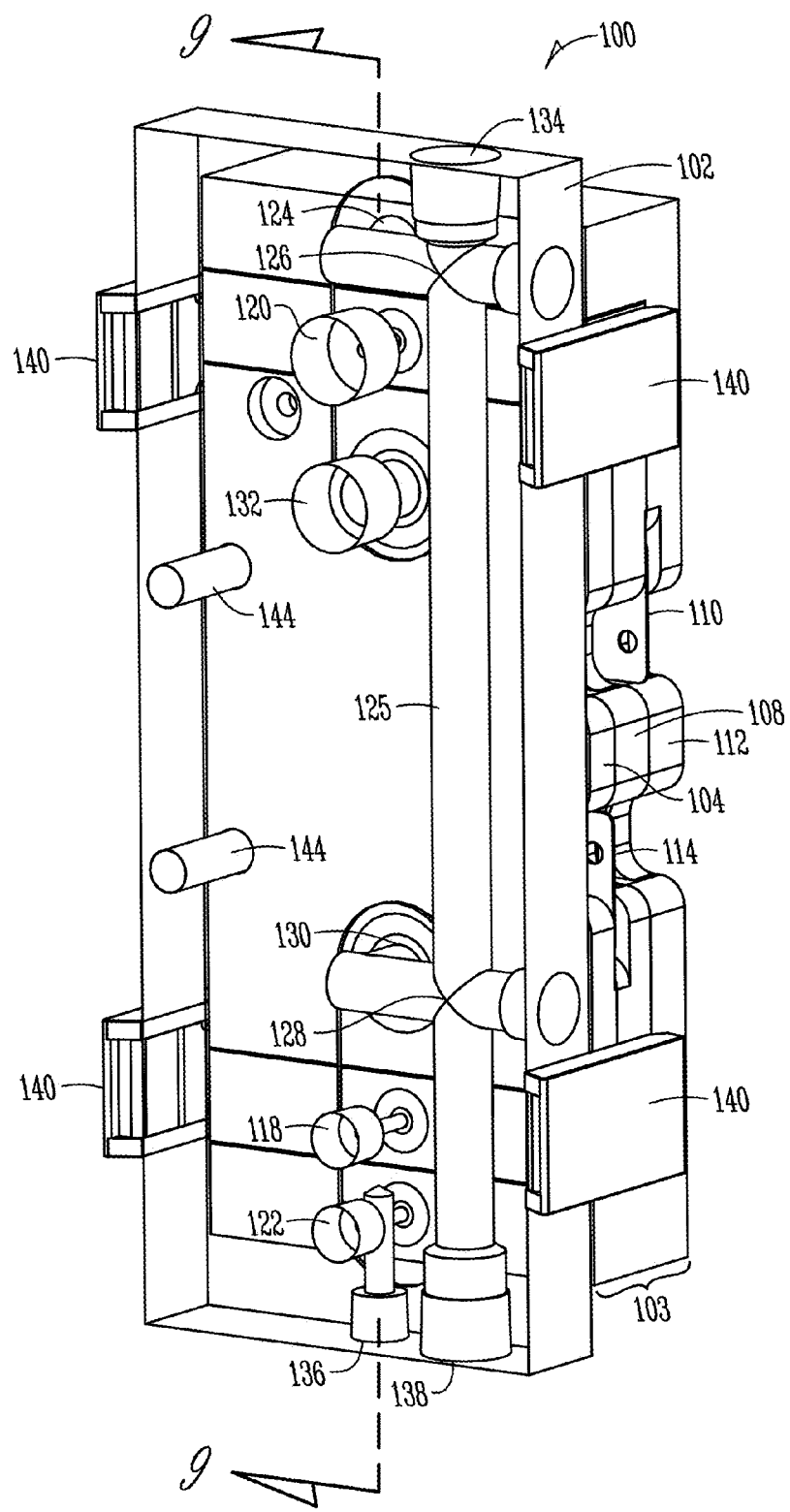
FIG. 4 is a perspective view illustrating an exemplary embodiment of a host manifold connected to components of the guest device of the electrolytic cell.
Figure 5:
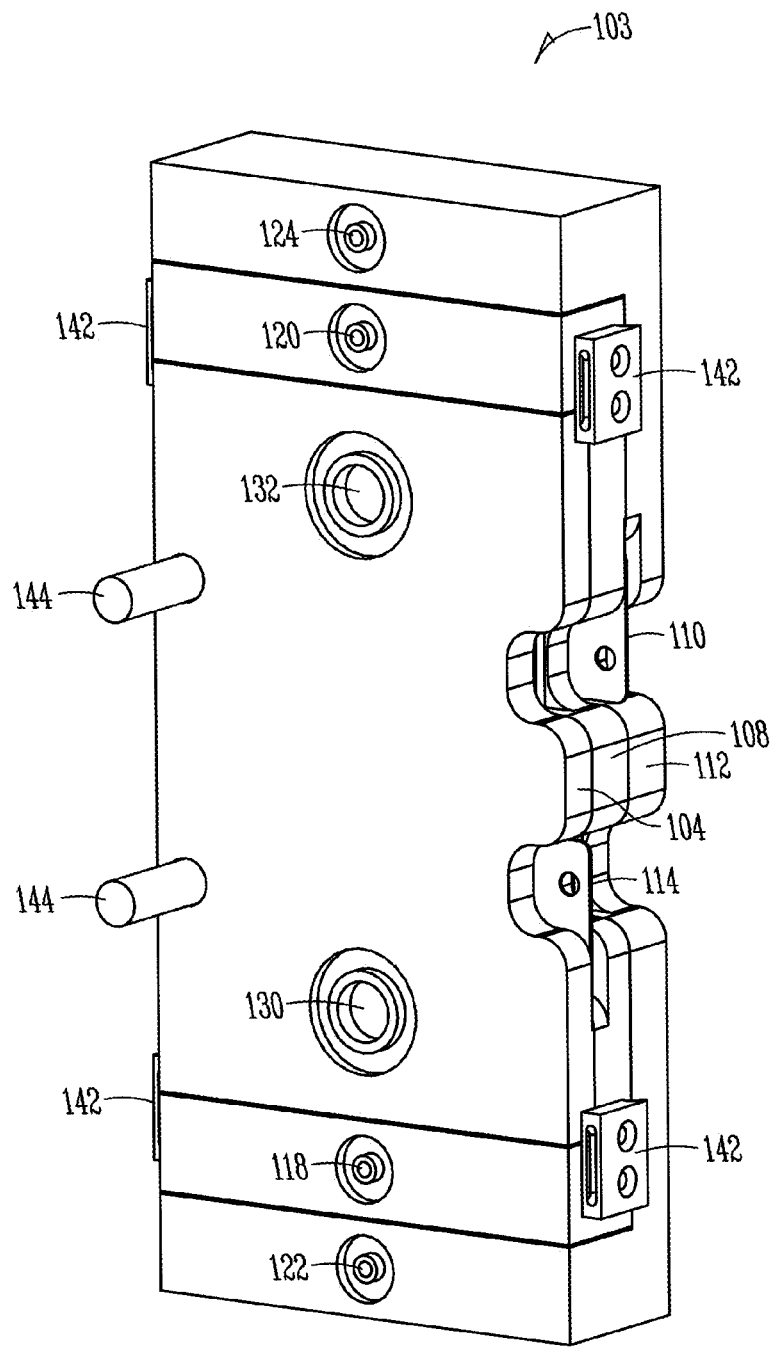
FIG. 5 is a perspective view with the host manifold hidden to illustrate one face of the electrolytic cell according to an exemplary embodiment of the present invention.
Figure 6:
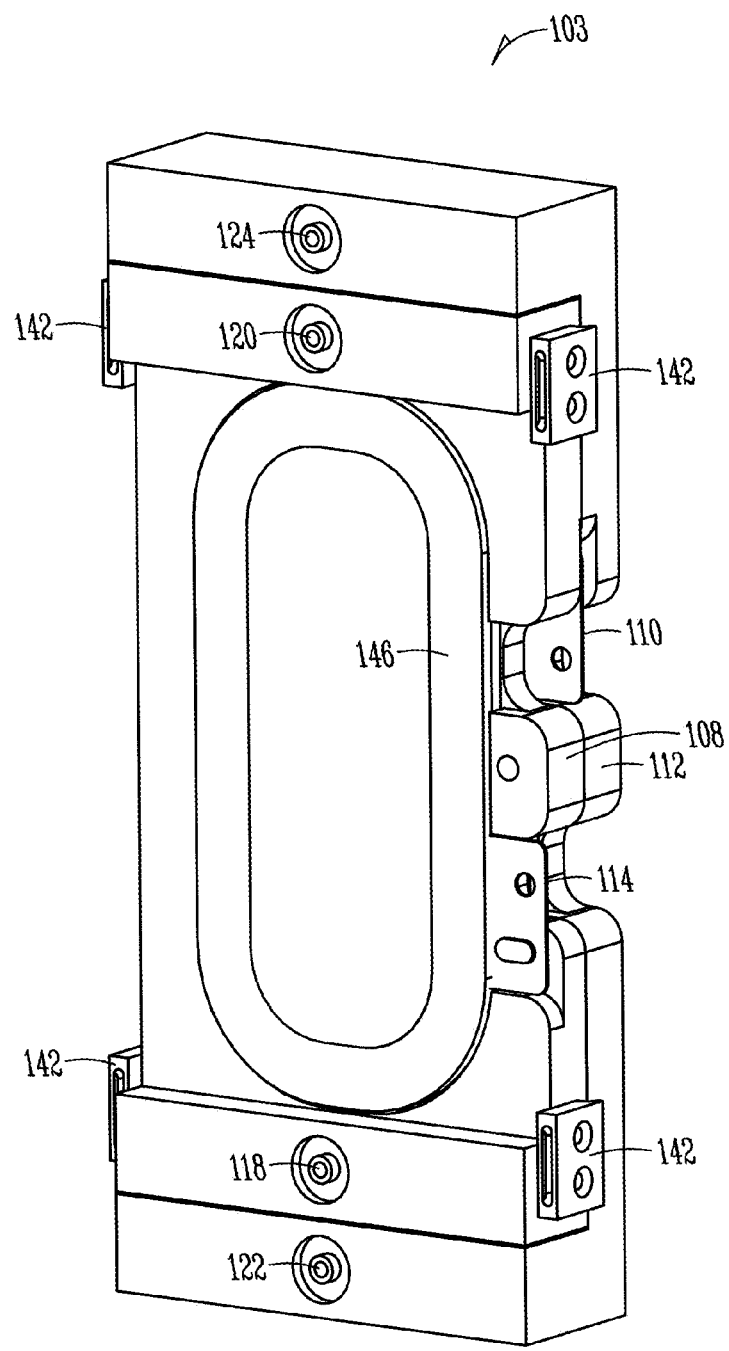
FIG. 6 is a perspective view with the anode chamber hidden to illustrate features of a brine chamber.
Figure 7:
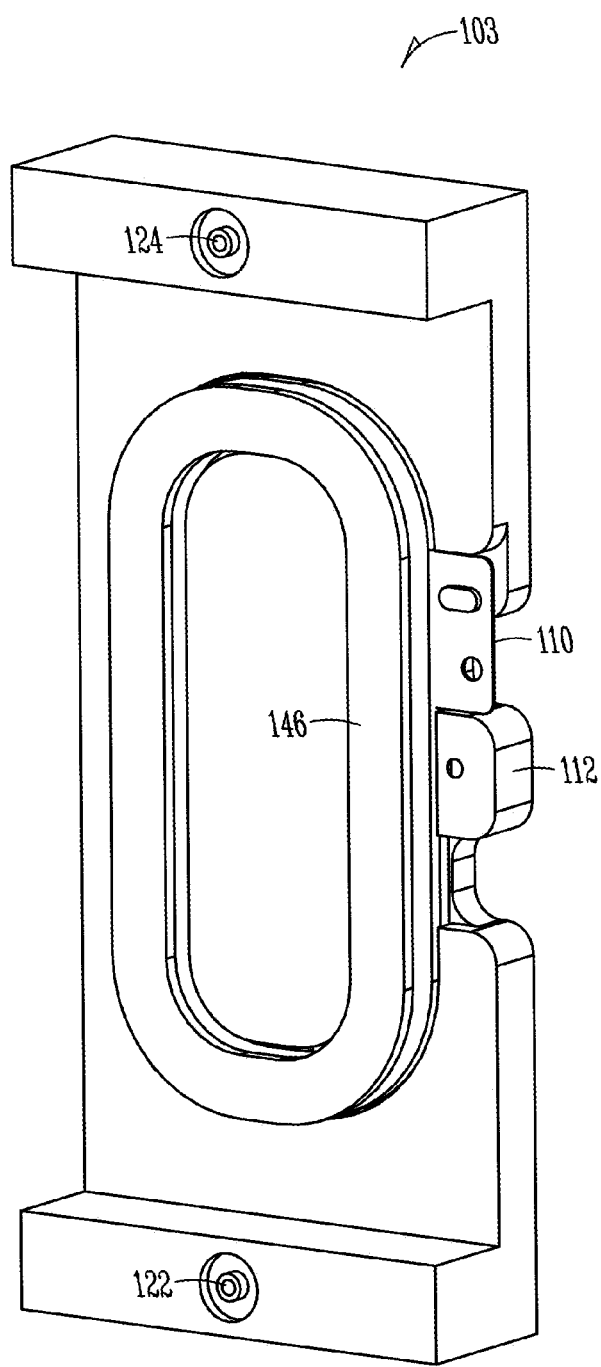
FIG. 7 is a perspective view with the anode and brine chambers hidden to illustrate other features of the electrolytic cell according to an exemplary embodiment of the present invention.

FIGS. 4-9 provide several views of an exemplary electrolytic cell 100 according that achieves the objectives of the present invention. The electrolytic cell 100 embodies the principles discussed above relative to the schematic shown in FIGS. 1A-C, and is but one example of the principles discussed and reduced into an exemplary electrolytic cell 100 configured for quick and easy service, repair and/or replacement. For purposes of illustration only, the host manifold 102 shown in FIG. 4 is illustrated as a transparent piece. The host manifold may be configured from polypropylene or polyethylene or polyvinyl chloride (PVC). Preferably, the host manifold 102 is manufactured from a material that is easily machined or molded with the inlets, outlets, and flow paths that are discussed herein. As illustrated, the electrolytic cell 100 includes a brine chamber 108, an anode chamber 104 and a cathode chamber 112. These chambers have been configured so that the inlets and outlets to each chamber are disposed on the same side of the guest device 103. This same side is attached to the host manifold 102 as best illustrated in FIG. 4. The host manifold 102 may be separated from the guest device 103 housing chambers 104, 108, and 112 by releasing toggle clamps 140 secured to tabs 142 illustrated in FIG. 5. Other means are also contemplated for securing the manifold 102 to the chambers 104, 108, and 112, such as latches, pins, bands, straps or other securing means. In another aspect, bolts may be configured to pass through the host manifold 102 from the guest device 103; a nut threaded to the ends of the bolts secures the host manifold 102 and guest device 103 together. Generally, the manifold 102 is configured so as to be removably attachable to the guest device 103 housing chambers 104, 108, and 112.

Figure 8:
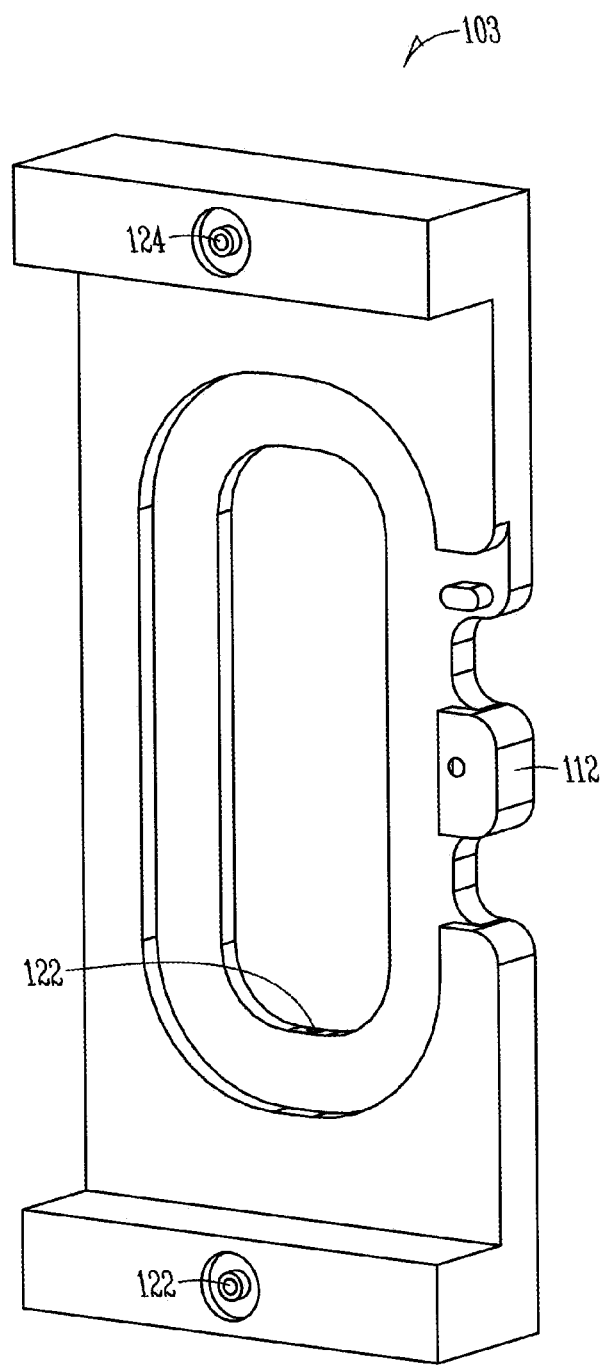
FIG. 8 is a perspective view with the anode and brine chambers hidden to illustrate features of a cathode chamber.
Figure 9:
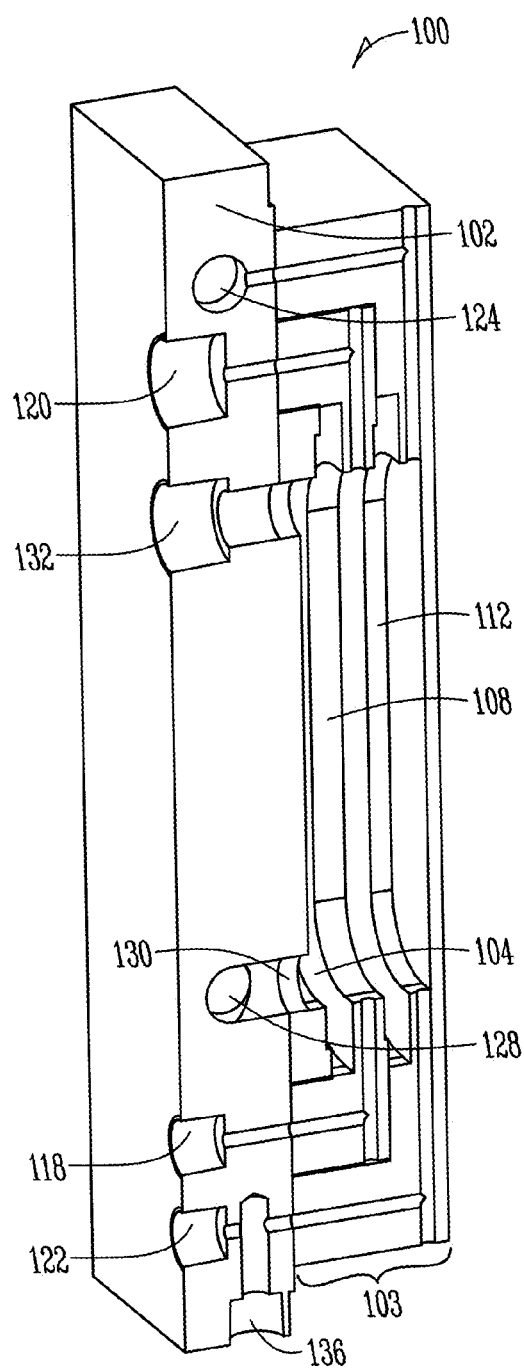
FIG. 9 is a sectional view taken along line 9-9 in FIG. 4 illustrating exemplary features of the electrolytic cell.

In one embodiment of the electrolytic cell 100, inlets and outlets to the cell 100 are configured in the host manifold 102, which allows the guest device 103 to be attached to respective plumbing on a single side of the cell (i.e., the host manifold side of the cell 100). Once the host manifold 102 has been plumbed and wired, and the respective hoses, wiring and conduit have been attached, the chambers 104, 108, and 112 housed in the guest device 103 may be separated together from the manifold 102 without having to disassemble any of the plumbing and/or wiring by unbuckling the toggle clamps 140. This provides a technician quick access to the chambers 104, 108, and 112 of the cell 100 for troubleshooting, replacing components or conducting maintenance procedures without having to disassemble and/or re-plumb fittings and tubing (e.g., pipes, hoses, etc.) to the cell 100. Generally speaking, the electrolytic cell 100 has three inputs, namely water, electrolyte and electrical current. These inputs are may all be plumbed and wired to the various components in the guest device 103 via the host manifold 102. For example, the host manifold 102 includes an inlet 122 connected in fluid communication with the cathode chamber 112. Thus, the inlet 122 may be connected or plumbed to a line supplying water from a water source (e.g., source 37 shown in FIG. 1). Also connected in fluid communication with the cathode chamber 112 is a drain outlet 136, which allows catholyte generated in the cathode chamber 112 to be drained from the cell 100 during maintenance, replacement or troubleshooting of the cell, or when the cell is not being operated. As previously indicated, the drain outlet 136 and/or the flow path between the cathode chamber 112 may include a flow control device (e.g., a manual or electrical valve) for selectively opening and closing flow of catholyte from the cathode chamber 112 through drain outlet 136. The flow control device may be included within the host manifold 102 or may be a separate component plumbed into the line connected to the drain outlet 136 in the host manifold 102. As best illustrated in FIG. 9, the inlet 122 to the cathode chamber 112 is connected in fluid communication with a flow path that travels through the host manifold 102, guest device 103 and into the cathode chamber 112. Water flows through the inlet 122 in the host manifold 102 into the cathode chamber 112 in the guest device 103 by passing through the flow path in the host manifold 102 and the respective component part of the guest device 103 that makes up the cathode chamber 112. Similarly, when the cathode chamber 112 is to be drained, the catholyte flows from the chamber through the flow path in the host manifold 102 and out the drain outlet 136. FIG. 8 best illustrates the inlet 122 into the cathode chamber 112 in a component of the guest device 103. The catholyte formed in the cathode chamber 112 in the guest device 103 exits the cathode chamber 112 through the flow path connected in fluid communication with the outlet 124. As illustrated in FIG. 4, the outlet 124 to the cathode chamber 112 in the guest device 103 is connected in fluid communication with the inlet 126 to the degassing chamber 125 in the host manifold 102. According to one embodiment of the invention, the degassing chamber 125 is an elongated conduit housed in the host manifold 102 that is oriented vertically when the electrolytic cell 100 is installed. According to one aspect of the invention, the degassing chamber 125 includes a pair of outlets. One of the outlets 128 in the host manifold 102 is connected in fluid communication with the inlet 130 to the anode chamber 104 in the guest device 103. The other outlet to the degassing chamber 125 in the host manifold 102 is a drain outlet 138 that can be selectively opened and closed for draining fluid from the degassing chamber 125 in the host manifold 102 and/or the anode chamber 104 in the guest device 103. As previously indicated, a flow control device may be configured within the host manifold 102 at the outlet 138 of the degassing chamber 125 or may be plumbed into a line (e.g., output 21 shown in FIG. 1 plumbed to drain 23) connected in fluid communication with the outlet 138. Thus, fluid may be drained from both chambers when the guest device 103 is not in operation, needs to be repaired, or is replaced. The host manifold 102 also includes an outlet 132 connected in fluid communication with the anode chamber 104 in the guest device 103 whereby an output solution generated by the cell is output from the guest device 103 and dispensed from the host manifold 102. Communication of fluid through the degassing chamber 125 in the host manifold 102 and anode chamber 104 in the guest device 103 is preferably accomplished by force of gravity acting on the body of liquid within the degassing chamber 125. To accomplish this, the outlet to the anode chamber 104 in the guest device 103 is positioned at an elevation above the outlet 128 to the degassing chamber 125 in the host manifold 102 to permit a reservoir of liquid to form in the degassing chamber 125. The reservoir of liquid preferably remains within the degassing chamber 125 for an adequate amount of time to allow hydrogen gas to vent from the degassing chamber 125 through the flow path in the host manifold 102 and out the outlet vent 134. As the degassing chamber 125 fills to the level of the outlet of the anode chamber 104 the head pressure acting on the liquid in the degassing chamber 125 forces liquid through the anode chamber 104 in the guest device 103 and out the outlet under force of gravity. To facilitate electrolysis, an electrolyte is provided at the brine chamber 108 in the guest device 103. An inlet 118 in the host manifold 102 is connected in fluid communication with the brine chamber 108 in the guest device 103. The brine chamber 108 also includes an outlet in the guest device connected in fluid communication with a flow path and outlet 120 in the host manifold 102. As shown in the several views, the chambers in the guest device 103 may be separated by an anion exchange membrane 106 and anode electrode 114 on one side and a cation exchange membrane 116 and a cathode electrode 110 on the other side. Electrical wires (not shown) for providing electricity to the electrodes 110 and 114 may be routed through the host manifold 102 and guest device 103 into connection with the electrodes 110 and 114. The electrical wires may be removably connectable at the interface of the host manifold 102 and guest device 103 by separating the guest device from the host manifold. A membrane support (not shown), such as a nonwoven polyester (e.g., felt), is preferably housed within the brine chamber 108 in the guest device 103. Other features such as one or more gaskets 146, and/or O-rings may also be included to seal off interfaces between the cells and/or components of or within each cell in the guest device and the interface with the host manifold 102. Other membranes as discussed above may also be included in the cell to promote efficient electrolysis of the water and increased chlorine concentration and capture efficiencies. Additional description of these components, their operation and preferred materials is provided or may be referred to in U.S. patent application Ser. Nos. 11/438,454 and 13/185,874. Other features such as alignment posts 144 may be configured in either the host manifold 102 and/or guest device 103 of the cell 100 for permitting the cell to be assembled and disassembled during maintenance, replacement of the guest device 103, or troubleshooting the cell 100.

The invention being thus described, it will be obvious that the same may be varied in many ways. Such variations are not to be regarded as a departure from the spirit and scope of the inventions and all such modifications are intended to be included within the scope of the following claims.

What is claimed is:

1. An electrolytic cell configured for simple and rapid cell troubleshooting, removal and replacement during service and maintenance procedures comprising:
   a distribution manifold having a host interface and a flow path originating at an inlet and terminating at an outlet;
   a cathode section having a flow path adapted for carrying cations and a guest interface with an exchange connection configured for removably seating at the host interface;
   an anode section having a flow path adapted for carrying anions and a guest interface with an exchange connection configured for removably seating at the host interface; and
   an electrode associated with respective anode and cathode sections;
   a degassing chamber within the distribution manifold and in fluid communication with the flow path of the cathode section at the host interface and the flow path of the anode section at the host interface;
   said cathode and anode sections positioned adjacent one another with inlets and outlets disposed on substantially the same side of the distribution manifold with one of the anode or cathode sections at least partially within the other;
   wherein the cathode, anode and electrolyte sections are removably staged at the host interface by one or more connectors, said connectors comprising actuable securing members that can removably attach the sections to the host interface to allow for access to the sections for simple and rapid cell troubleshooting, removal and replacement during service and maintenance procedures thereof.

2. The electrolytic cell of claim 1 further comprising an electrolyte section having a flow path adapted for carrying an electrolyte and a guest interface with an exchange connection configured for removably seating at the host interface.

3. The electrolytic cell of claim 2 further comprising an exchange membrane removably received between cathode and anode flow paths and the electrolyte flow path.

4. The electrolytic cell of claim 1 wherein the flow path originating at the inlet in the distribution manifold is in plumbed connection to an electrolyte source.

5. The electrolytic cell of claim 1 wherein the degassing chamber has an inlet and an outlet, the inlet being positioned above the outlet so as to gravity feed a catholyte from the cathode section to the anode section.

6. The electrolytic cell of claim 2 wherein the flow path originating at the inlet in the distribution manifold is in plumbed connection to a water source.

7. The electrolytic cell of claim 1 wherein the actuable securing members comprise:
   a. toggle clamps;
   b. latches;
   c. pins;
   d. bands;
   e. straps; or
   f. bolts.

8. The electrolytic cell of claim 1 wherein the cathode and anode exchange connections comprise an inlet and outlet to the respective cathode and anode flow paths.

9. The electrolytic cell of claim 1 wherein the cathode and anode exchange connections comprise an electrical connection to the respective cathode and anode electrodes.

10. The electrolytic cell of claim 1 wherein the cathode and anode exchange connections comprise alignment points to align the respective cathode and anode guest interfaces with the host interface.

11. A system configured for simple and rapid troubleshooting, removal and replacement of an electrolytic cell during service and maintenance procedures comprising:
   a. a distribution manifold having a host interface and a flow path originating at an inlet and terminating at an outlet at the host interface; and
   b. a guest device removably connected at a face of the host interface comprising:
      i. a guest interface with an exchange connection configured for removably seating at the host interface of the distribution manifold;
      ii. an electrolytic cell having a cathode section with a flow path adapted for carrying cations and an anode section having a flow path adapted for carrying anions in fluid communication with the guest; and
      iii. the electrolytic cell in fluid communication with the exchange connection at the guest interface
      iv. said cathode and anode sections positioned adjacent one another with inlets and outlets disposed on substantially the same side of the distribution manifold with one of the anode or cathode sections at least partially within the other;
   c. a degassing chamber within the distribution manifold and in fluid communication with the flow path of the cathode section at the host interface and the flow path of the anode section at the host interface; and wherein the guest device is removably staged at the host interface by one or more connectors, said connectors comprising actuable securing members that can removably attach the guest device to the host interface to allow for access to the sections for simple and rapid cell troubleshooting, removal and replacement during service and maintenance procedures thereof.

* * * * *